US011368175B2

(12) United States Patent
Jimenez et al.

(10) Patent No.: US 11,368,175 B2
(45) Date of Patent: Jun. 21, 2022

(54) RADIO FREQUENCY CONTROL CIRCUIT

(71) Applicant: Qorvo US, Inc., Greensboro, NC (US)

(72) Inventors: Jose Jimenez, Dallas, TX (US); Bror Peterson, Fairview, TX (US); Jeffrey Gengler, McKinney, TX (US)

(73) Assignee: QORVO US, INC., Greensboro, NC (US)

( * ) Notice: Subject to any disclaimer, the term of this patent is extended or adjusted under 35 U.S.C. 154(b) by 0 days.

(21) Appl. No.: 15/903,113

(22) Filed: Feb. 23, 2018

(65) Prior Publication Data

US 2018/0262220 A1    Sep. 13, 2018

Related U.S. Application Data

(60) Provisional application No. 62/467,906, filed on Mar. 7, 2017.

(51) Int. Cl.
*H04B 1/04* (2006.01)
*H04B 1/401* (2015.01)
*H04B 1/00* (2006.01)

(52) U.S. Cl.
CPC ............ *H04B 1/04* (2013.01); *H04B 1/401* (2013.01); *H04B 1/0028* (2013.01); *H04B 2001/0425* (2013.01); *H04B 2001/0433* (2013.01)

(58) Field of Classification Search
CPC ................................. H04B 1/0475; H03F 3/24
(Continued)

(56) References Cited

U.S. PATENT DOCUMENTS

2007/0281635 A1* 12/2007 McCallister ............. H03C 5/00
 455/126
2008/0008263 A1* 1/2008 Keerthi ................. H03F 1/0222
 375/297

(Continued)

OTHER PUBLICATIONS

Chauhan, H., et al., "A Tuning Technique for Temperature and Process Variation Compensation of Power Amplifiers with Digital Predistortion," Proceedings of the 2016 IEEE 25th North Atlantic Test Workshop (NATW), May 9-11, 2016, Providence, Rhode Island, USA, pp. 38-45.

(Continued)

*Primary Examiner* — Shuwang Liu
*Assistant Examiner* — Gina M McKie
(74) *Attorney, Agent, or Firm* — Withrow & Terranova, P.L.L.C.

(57) ABSTRACT

A radio frequency (RF) control circuit is provided. The RF control circuit includes power amplifier (PA) circuitry for amplifying an RF signal and control circuitry configured to improve linearity of the PA circuitry based on a PA signature(s) already available and utilized to perform digital pre-distortion (DPD) in the RF control circuit. In examples discussed herein, the control circuitry determines a performance deviation of the PA circuitry based on the PA signature and continuously adjusts a bias voltage(s) supplied to the PA circuitry until the performance deviation is reduced to a predetermined performance deviation threshold. By continuously monitoring the performance deviation based on the PA signature(s) and adjusting the bias voltage(s), the control circuitry can detect and correct an operation abnormality of the PA circuitry in a timely manner. As a result, it is possible to maintain linearity in the PA circuitry for enhanced PA performance.

10 Claims, 6 Drawing Sheets

(58) Field of Classification Search
USPC .......................................................... 375/297
See application file for complete search history.

(56) References Cited

U.S. PATENT DOCUMENTS

| | | | | |
|---|---|---|---|---|
| 2010/0049465 | A1* | 2/2010 | Pineda De Gyvez | H04B 17/15 702/122 |
| 2011/0136462 | A1* | 6/2011 | Dimpflmaier | H04B 1/005 455/343.1 |
| 2011/0227770 | A1* | 9/2011 | Kaper | H03M 1/1052 341/120 |
| 2011/0235622 | A1* | 9/2011 | Kash | H04L 25/03891 370/338 |
| 2012/0071120 | A1* | 3/2012 | Pinarello | H03F 1/0244 455/127.5 |
| 2012/0154036 | A1* | 6/2012 | Oh | H03F 1/0266 330/127 |
| 2012/0155572 | A1* | 6/2012 | Kim | H03F 1/3247 375/297 |
| 2012/0219048 | A1* | 8/2012 | Camuffo | H03F 1/3247 375/296 |
| 2013/0077713 | A1* | 3/2013 | Kim | H04B 1/0017 375/297 |
| 2013/0257529 | A1* | 10/2013 | Komninakis | H03F 1/0244 330/149 |
| 2013/0285748 | A1* | 10/2013 | Hongo | H03F 1/0222 330/291 |
| 2014/0118065 | A1* | 5/2014 | Briffa | H03F 1/0277 330/129 |
| 2015/0282716 | A1* | 10/2015 | Smeltzer | G01N 33/569 600/431 |
| 2016/0204809 | A1* | 7/2016 | Pratt | H04B 1/04 375/219 |

OTHER PUBLICATIONS

Chen, S., et al., "Adaptive Gate Bias for Power Amplifier Temperature Compensation," IEEE Transactions on Device and Materials Reliability, vol. 11, No. 3, Sep. 2011, pp. 442-449.

* cited by examiner

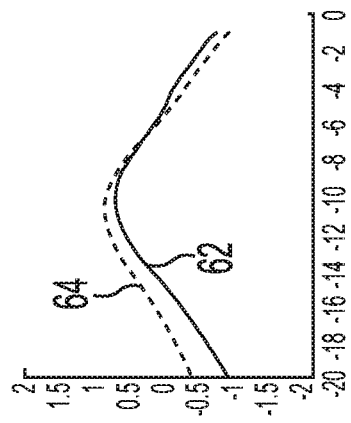
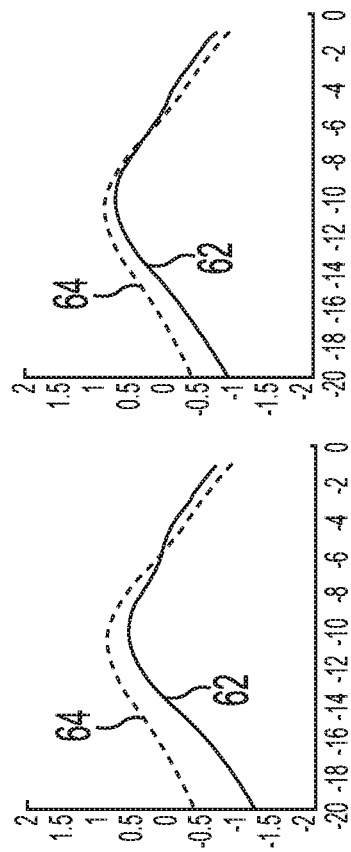
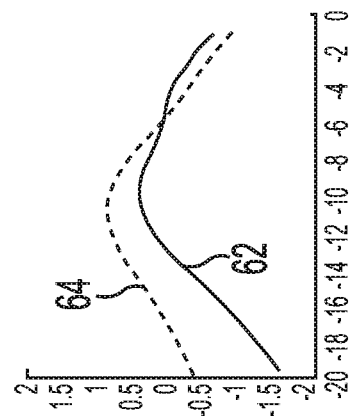
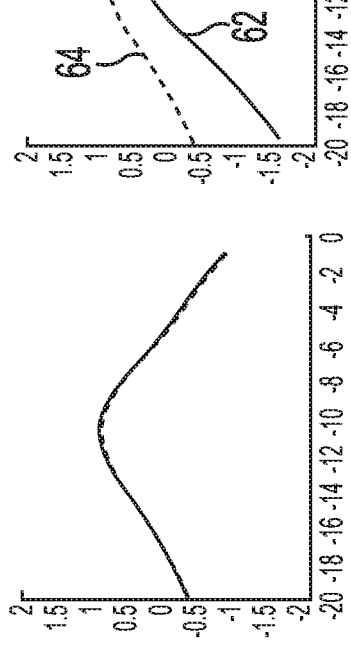
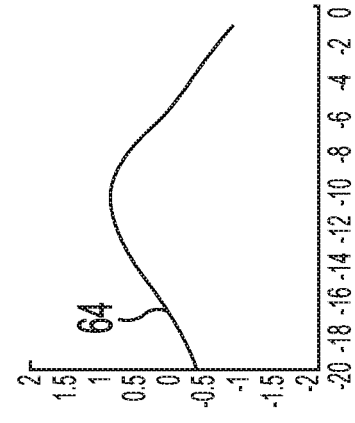
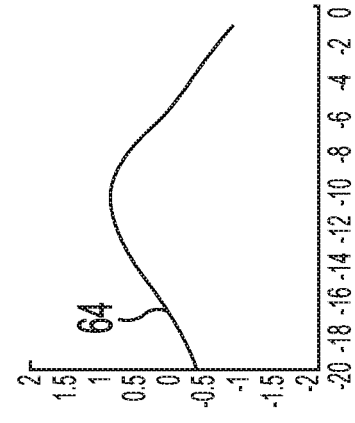
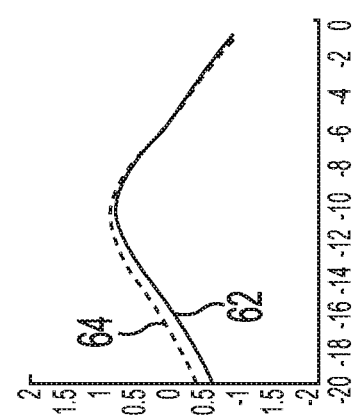
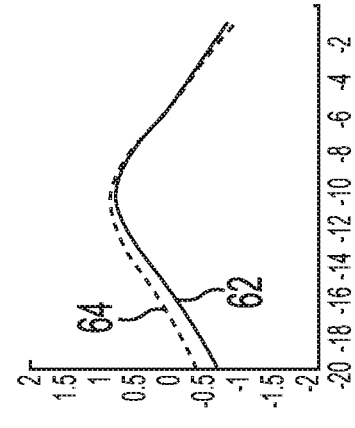

RADIO FREQUENCY CONTROL CIRCUIT

RELATED APPLICATIONS

This application claims the benefit of provisional patent application Ser. No. 62/467,906, filed Mar. 7, 2017, the disclosure of which is hereby incorporated herein by reference in its entirety.

FIELD OF THE DISCLOSURE

The technology of the disclosure relates generally to power control in wireless communication devices and/or systems.

BACKGROUND

Wireless communication devices have become increasingly common in current society. The prevalence of these mobile communication devices is driven in part by the many functions that are now enabled on such devices.

Increased processing capabilities in such devices means that mobile communication devices have evolved from being pure communication tools into sophisticated mobile multimedia centers that enable enhanced user experiences.

The redefined user experience requires higher data rates offered by such advanced wireless communication systems as long-term evolution (LTE) and fifth-generation new radio (5G-NR). Typically, such wireless communication systems are configured to operate based on orthogonal frequency division multiplexing (OFDM) over a vast number of subcarriers. Furthermore, higher order modulation and coding schemes (MCS) are introduced to pack more data bits into a signal symbol, thus resulting in an increasingly tighter MCS constellation. Thus, to achieve higher data rates in the wireless communications systems, sophisticated power amplifiers (PAs) are often employed in base stations and mobile communication devices to increase output power of radio frequency (RF) signals. The increased output power can help maintain sufficient energy per bit and/or signal-to-noise ratio (SNR) such that the signal symbols can be correctly received and decoded.

The increased number of subcarriers and the higher order MCS employed in the wireless communication systems have augmented linearity requirements of the electronic components, particularly the PAs, employed in the wireless communication system for transmitting the RF signals. However, increasing raw linearity of semiconductor components used in the PAs, such as laterally diffused metal-oxide semiconductor (LDMOS), Gallium nitride (GaN), and Gallium arsenide (GaAs), may not be enough to achieve the linearity requirements of the advanced wireless communication systems. Thus, it may be desirable to increase linearity performance of the PAs to improve RF performance of the wireless communication systems, thus enabling enhanced user experience.

SUMMARY

Aspects disclosed in the detailed description include a radio frequency (RF) control circuit. The RF control circuit includes power amplifier (PA) circuitry for amplifying an RF signal and control circuitry configured to improve linearity of the PA circuitry. In particular, the control circuitry is configured to improve linearity of the PA circuitry based on a PA signature(s) already available and utilized to perform digital pre-distortion (DPD) in the RF control circuit. In examples discussed herein, the control circuitry determines a performance deviation of the PA circuitry based on the PA signature and continuously adjusts a bias voltage(s) supplied to the PA circuitry until the performance deviation is reduced to a predetermined performance deviation threshold. By continuously monitoring the performance deviation based on the PA signature(s) and adjusting the bias voltage(s), the control circuitry can detect and correct an operation abnormality (e.g., current drift), which may degrade linearity of the PA circuitry, in a timely manner. As a result, it is possible to maintain linearity in the PA circuitry for enhanced PA performance.

In one aspect, an RF control circuit is provided. The RF control circuit includes PA circuitry configured to amplify an RF signal based on a bias voltage and generate a PA feedback signal comprising a PA signature. The RF control circuit also includes control circuitry coupled to the PA circuitry. The control circuitry is configured to receive the PA signature. The control circuitry is also configured to determine a performance deviation between an actual PA performance parameter and a target PA performance parameter based on the PA signature. The control circuitry is also configured to adjust the bias voltage of the PA circuitry in one or more corrective iterations to reduce the performance deviation to a predetermined performance deviation threshold.

In another aspect, a method for optimizing PA circuitry in an RF control circuit is provided. The method includes receiving a PA feedback signal comprising a PA signature. The method also includes determining a performance deviation between an actual PA performance parameter and a target PA performance parameter of the PA circuitry based on the PA signature. The method also includes adjusting a bias voltage of the PA circuitry in one or more corrective iterations to reduce the performance deviation to a predetermined performance deviation threshold.

In another aspect, an RF control circuit is provided. The RF control circuit includes PA circuitry configured to amplify an RF signal based on a bias voltage. The RF control circuit also includes signal processing circuitry coupled to the PA circuitry. The signal processing circuitry is configured to receive a digital signal from a digital signal source. The signal processing circuitry is also configured to receive a PA feedback signal comprising a PA signature from the PA circuitry. The signal processing circuitry is also configured to perform DPD on the digital signal based on the PA signature. The signal processing circuitry is also configured to convert the digital signal into the RF signal and provide the RF signal to the PA circuitry. The RF control circuit also includes control circuitry coupled to the PA circuitry and the signal processing circuitry. The control circuitry is configured to receive the PA signature from the signal processing circuitry. The control circuitry is also configured to determine a performance deviation between an actual PA performance parameter and a target PA performance parameter based on the PA signature. The control circuitry is also configured to adjust the bias voltage of the PA circuitry in one or more corrective iterations to reduce the performance deviation to a predetermined performance deviation threshold.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 4A-4H are graphic diagrams providing exemplary illustrations of the RF control circuit of FIG. 2 configured to eliminate a power gain deviation through a number of corrective iterations.

DETAILED DESCRIPTION

Figure 1A:
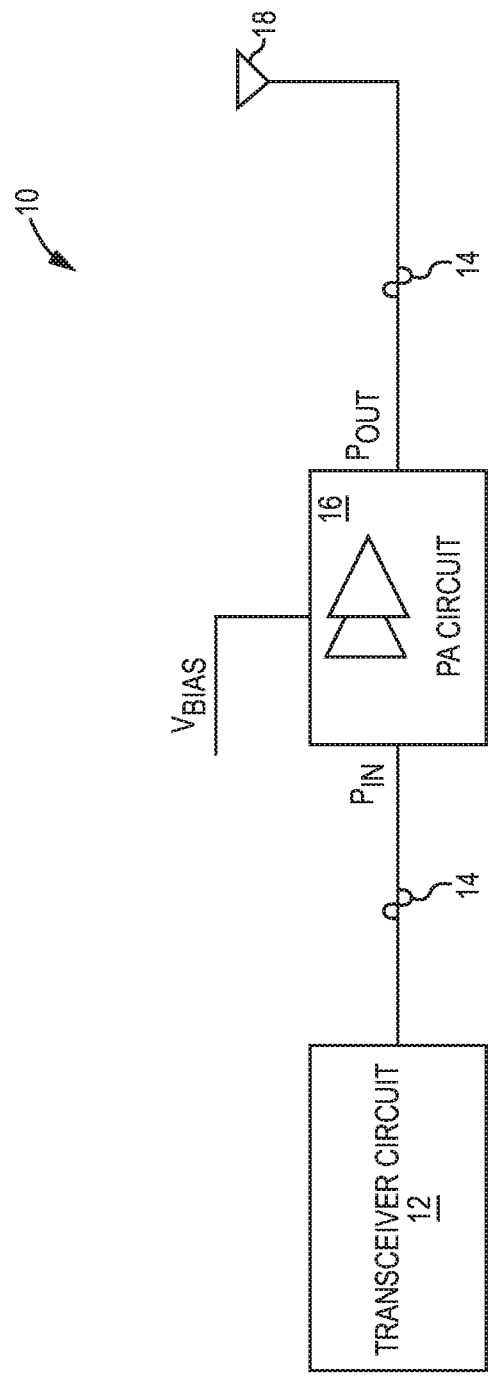
FIG. 1A is a schematic diagram of an exemplary conventional power amplifier (PA) system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a radio frequency (RF) control circuit. The RF control circuit includes power amplifier (PA) circuitry for amplifying an RF signal and control circuitry configured to improve linearity of the PA circuitry. In particular, the control circuitry is configured to improve linearity of the PA circuitry based on a PA signature(s) already available and utilized to perform digital pre-distortion (DPD) in the RF control circuit. In examples discussed herein, the control circuitry determines a performance deviation of the PA circuitry based on the PA signature and continuously adjusts a bias voltage(s) supplied to the PA circuitry until the performance deviation is reduced to a predetermined performance deviation threshold. By continuously monitoring the performance deviation based on the PA signature(s) and adjusting the bias voltage(s), the control circuitry can detect and correct an operation abnormality (e.g., current drift), which may degrade linearity of the PA circuitry, in a timely manner. As a result, it is possible to maintain linearity in the PA circuitry for enhanced PA performance.

Figure 1B:
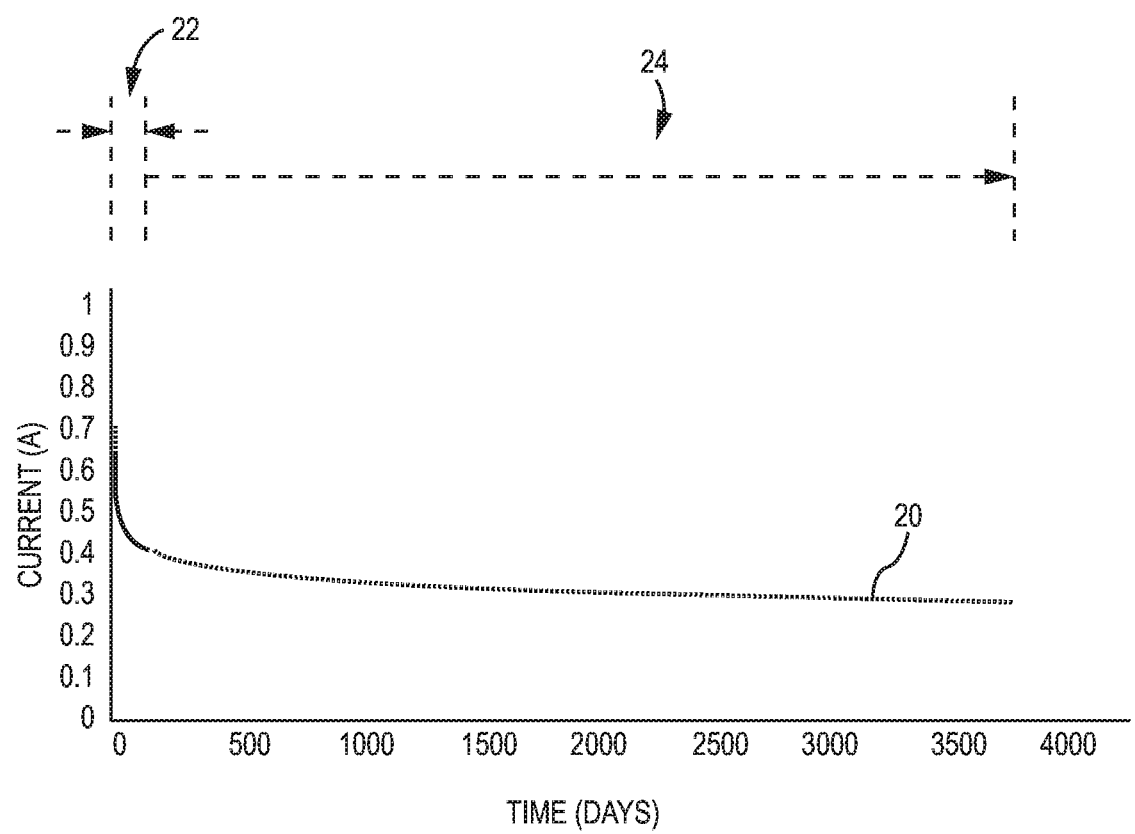
FIG. 1B is a graphic diagram providing an exemplary illustration of a quiescent current curve depicted as a function of days of operation of the PA circuit of FIG. 1A.
Figure 1C:
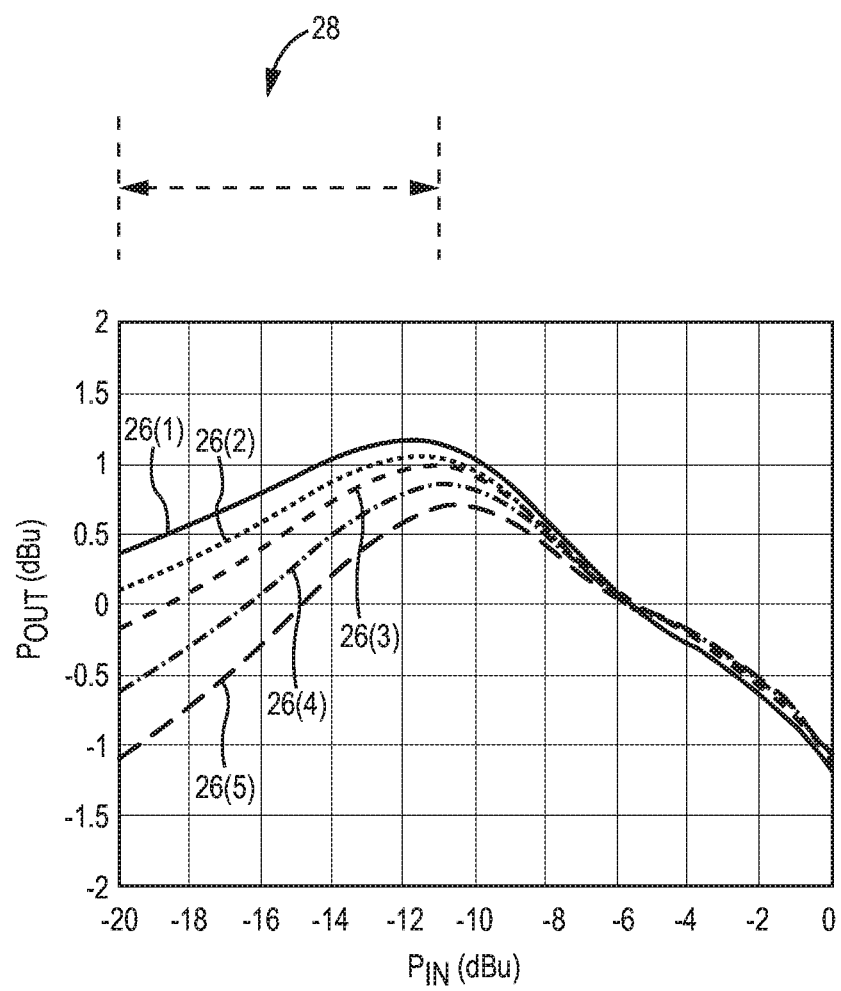
FIG. 1C is a graphic diagram providing an exemplary illustration of a number of normalized gain curves as a function of bias current in the PA circuit of FIG. 1A.

Before discussing the RF control circuit of the present disclosure, a brief overview of a conventional PA system is first provided with reference to FIGS. 1A-1C to help understand nonlinearity issues associated with the conventional PA system. The discussion of specific exemplary aspects of the RF control circuit according to the present disclosure starts below with reference to FIG. 2.

FIG. 1A is a schematic diagram of an exemplary conventional PA system 10. The conventional PA system 10 includes a transceiver circuit 12 configured to generate an RF signal 14. The conventional PA system 10 includes a PA circuit 16 configured to amplify the RF signal 14 from an input power $P_{IN}$ to an output power $P_{OUT}$ based on a bias voltage $V_{bias}$. The conventional PA system 10 includes an antenna 18 configured to transmit the RF signal 14. The PA circuit 16 typically includes such semiconductor components as laterally diffused metal-oxide semiconductor (LDMOS), Gallium nitride (GaN), and Gallium arsenide (GaAs).

Notably, when the PA circuit 16 is deployed in the field, its output point or bias can change and drift over time as a result of specific anomalies and characteristics of the underlying semiconductor components. For example, dislocations between a channel and a barrier of the semiconductor components may cause electrons or holes to be trapped and de-trapped periodically under certain conditions. The amount of drift and rate-of-change of the drift may be a function of many factors, such as hours of operation, input power, temperature, pressure, humidity, and so on. This may be particularly true in such equipment as base stations that have limited temperature isolation capabilities. In most cases, the drift can lead to a reduction in quiescent current and/or in-effect shifting of gate bias threshold.

FIG. 1B is a graphic diagram providing an exemplary illustration of a quiescent current curve 20 depicted as a function of days of operation of the PA circuit 16 of FIG. 1A. As shown in FIG. 1B, the quiescent current 20 declines rapidly in a first period 22 (e.g., first 100 days of deployment) and stabilizes in a second period 24 (e.g., after the first 100 days of deployment).

With reference back to FIG. 1A, the PA circuit 16 may be configured to operate in power class A or power class A/B. As a consequence of the quiescent current drift, the PA circuit 16 may drift into power class B or even power class C. In this regard, it may be more difficult to maintain linearity in the PA circuit 16. As a result, the PA circuit 16 may not perform up to the required performance specification.

FIG. 1C is a graphic diagram providing an exemplary illustration of a number of normalized gain curves 26(1)-26(5) as a function of bias current in the PA circuit 16 of FIG. 1A. The normalized gain curves 26(1)-26(5) indicate gain responses of the PA circuit 16 at 20 mA/mm, 16 mA/mm, 12 mA/mm, 8 mA/mm, and 4 mA/mm bias currents, respectively. As illustrated by the normalized gain curves 26(1) and 26(5), the PA circuit 16 undergoes a large shift in the gain responses when the bias current drifts from 20 mA/mm to 4 mA/mm, particularly in a back off region 28. Such behavior is true in all semiconductors, but is particularly true in high power density transistors, which may be fabricated on GaN and have an initial bias voltage set for the power class A/B operation to maximize linearity and efficiency.

Many conventional techniques have been adopted to help mitigate the gain response disparities as a function of bias current drifts. In a first example, the initial bias voltage of the PA circuit 16 can be set closer to the power class A operation (over-bias), thus creating a bias voltage margin for the power class A/B operation. In a second example, the PA circuit 16 can be subject to a burn-in period (e.g., several hours) prior to being placed in live operation. In a third example, the PA circuit 16 can be taken offline periodically to readjust the bias voltage. In a fourth example, the bias voltage of the PA circuit 16 can be adjusted by software based on a predetermined compensation table that takes into account the bias current drifts under various conditions (e.g., temperature, time, etc.).

Notably, the conventional techniques all have obvious shortcomings. Over-biasing the PA circuit 16 can reduce efficiency of the transistors in the PA circuit 16, burning-in the PA circuit 16 prior to live operation is costly and may not be suitable for high volume deployment, stopping operation of the PA circuit 16 periodically can lead to increased down time, and creating the compensation table may require extensive testing and characterization. As such, it may be desirable to detect and correct the bias current drift based on information already available in the PA circuit 16, without impacting operation and efficiency of the PA circuit 16.

Figure 2:
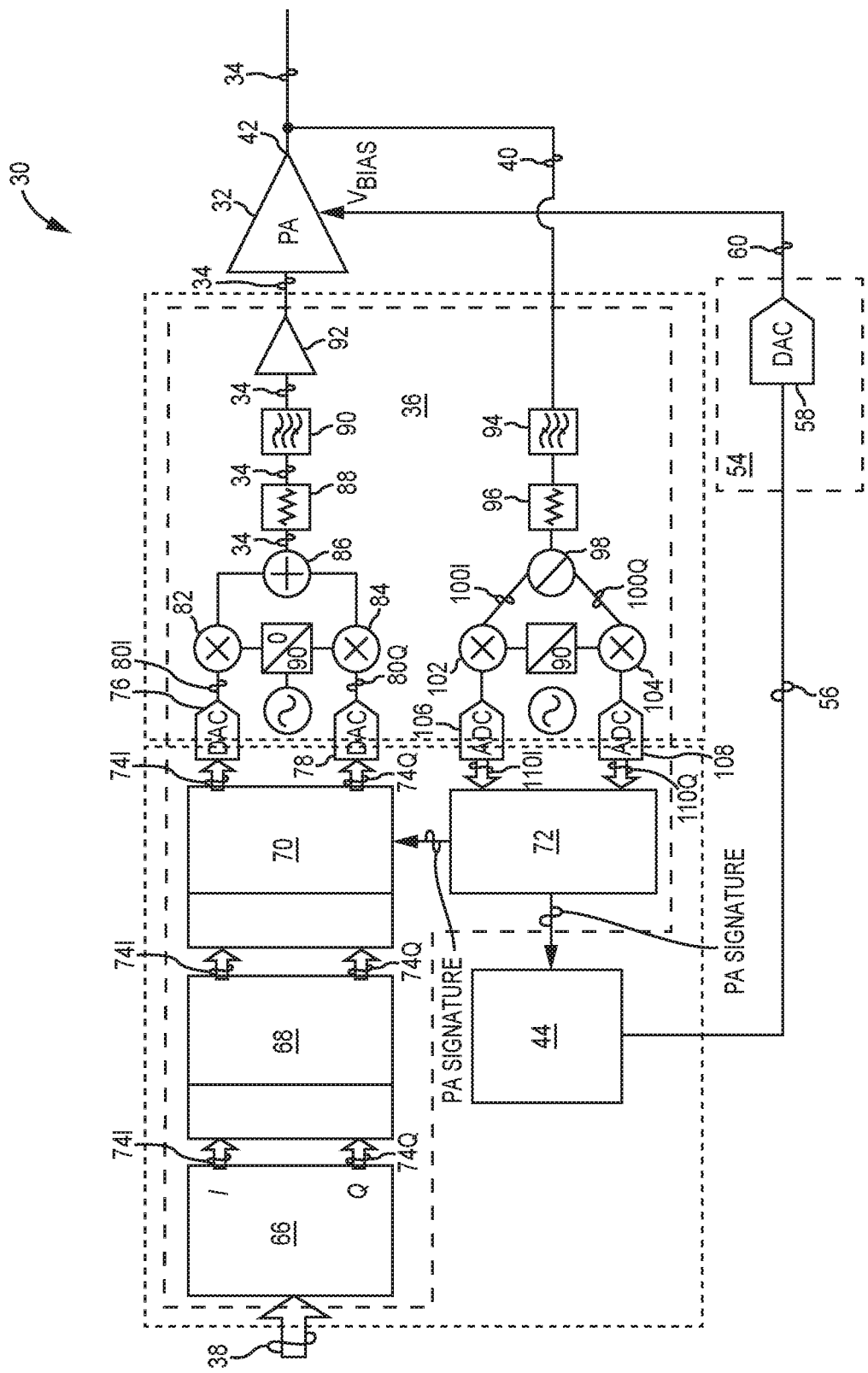
FIG. 2 is a schematic diagram of an exemplary radio frequency (RF) control circuit configured to maintain linearity of PA circuitry based on information already available and utilized for performing signal digital pre-distortion (DPD) in the RF control circuit.

In this regard, FIG. 2 is a schematic diagram of an exemplary RF control circuit 30 configured to maintain linearity of PA circuitry 32 based on information already available and utilized for performing signal DPD in the RF control circuit 30. As discussed below in detail, the RF control circuit 30 is configured to improve linearity of the PA circuitry 32 based on a PA signature(s) already available and utilized to perform digital pre-distortion (DPD) in the RF control circuit 30. The RF control circuit 30 can determine a performance deviation of the PA circuitry 32 based on the PA signature and continuously adjusts a bias voltage $V_{bias}$ supplied to the PA circuitry 32 until the performance deviation is reduced to a predetermined performance deviation threshold. By continuously monitoring the performance deviation based on the PA signature(s) and adjusting the bias voltage $V_{bias}$, the RF control circuit 30 can detect and correct an operation abnormality (e.g., current drift), which may degrade linearity of the PA circuitry 32, in a timely manner. As a result, it is possible to maintain linearity in the PA circuitry 32 for enhanced PA performance. In a non-limiting example, the RF control circuit 30 can essentially operate without requiring a prior calibrated compensation table.

The PA circuitry 32 is configured to amplify an RF signal 34 for transmission based on the bias voltage $V_{bias}$. In a non-limiting example, the PA circuitry 32 can be a Doherty PA circuitry that includes a pair of metal-oxide semiconductor field-effect transistors (MOSFETs). In this regard, the bias voltage $V_{bias}$ is provided to respective gate electrodes of the pair of MOSFETs as respective gate voltages. Accordingly, the bias voltage $V_{bias}$ can be adjusted to influence bias currents flowing through the pair of MOSFETs.

The RF control circuit 30 includes signal processing circuitry 36, which is coupled to the PA circuitry 32. The signal processing circuitry 36 is configured to receive a digital signal 38 from a digital signal source (e.g., a digital baseband unit). The digital signal 38 may be encoded based on such digital communication protocol as common public radio interface (CPRI). The signal processing circuitry 36 is also configured to convert the digital signal 38 into the RF signal 34 and provide the RF signal 34 to the PA circuitry 32.

Like the PA circuit 16 in FIG. 1A, the PA circuitry 32 can be inherently nonlinear. As such, the signal processing circuitry 36 is further configured to perform signal DPD on the digital signal 38 to compensate for the inherent nonlinearity of the PA circuitry 32. To do so, the signal processing circuitry 36 receives a PA feedback signal 40 from an output end 42 of the PA circuitry 32. The PA feedback signal 40 includes a PA signature reflecting such PA characteristics as gain characteristic (also known as AM/AM response) and/or phase characteristic (also known as AM/PM response) of the PA circuitry 32. The signal processing circuitry 36 can thus perform the DPD on the digital signal 38 based on the PA signature received in the PA feedback signal 40 to compensate for the inherent nonlinearity of the PA circuitry 32. As a result of the DPD, the signal processing circuitry 36 can flatten the normalized gain curves 26(1)-26(5) of FIG. 1C, thus improving gain linearity of the PA circuitry 32.

However, the signal processing circuitry 36 may be unable to effectively overcome a linearity drift of the PA circuitry 32 as a result of the bias current drift in the MOSFETs of the PA circuitry 32. In this regard, the RF control circuit 30 further includes control circuitry 44 to help overcome the nonlinearity drift resulting from the bias current drift in the PA circuitry 32. In a non-limiting example, the control circuitry 44 can be provided as a microprocessor, a microcontroller, or a field-programmable gate array (FPGA).

The control circuitry 44 is coupled to the PA circuitry 32 and to the signal processing circuitry 36. As such, the control circuitry 44 can receive the PA signature via the signal processing circuitry 36. In a non-limiting example, the signal processing circuitry 36 can provide the PA signature to the control circuitry 44 by forwarding the PA feedback signal 40 to the control circuitry 44. Based on the PA signature, the control circuitry 44 can determine a performance deviation between an actual PA performance parameter and a target PA performance parameter. In a non-limiting example, the control circuitry 44 can maintain the target PA performance parameter in a look-up-table (LUT) and store the LUT in a cache memory. Accordingly, the control circuitry 44 can adjust the bias voltage(s) $V_{bias}$ in one or more corrective iterations to reduce the performance deviation to a predetermined performance deviation threshold. In this regard, the control circuitry 44 can detect and correct a bias current drift in the PA circuitry 32 in a timely manner. Moreover, the control circuitry 44 can detect the performance deviation solely based on the PA signature already utilized by the signal processing circuitry 36, and adjust the bias voltage $V_{bias}$ either concurrent to or independent from the DPD performed by the signal processing circuitry 36. By continuously adjusting the bias voltage $V_{bias}$, the control circuitry 44 can maintain a constant bias current in the PA circuitry 32, thus helping to overcome the linearity drift resulting from the bias current drift and enhance linear gain of the PA circuitry 32.

Figure 3:
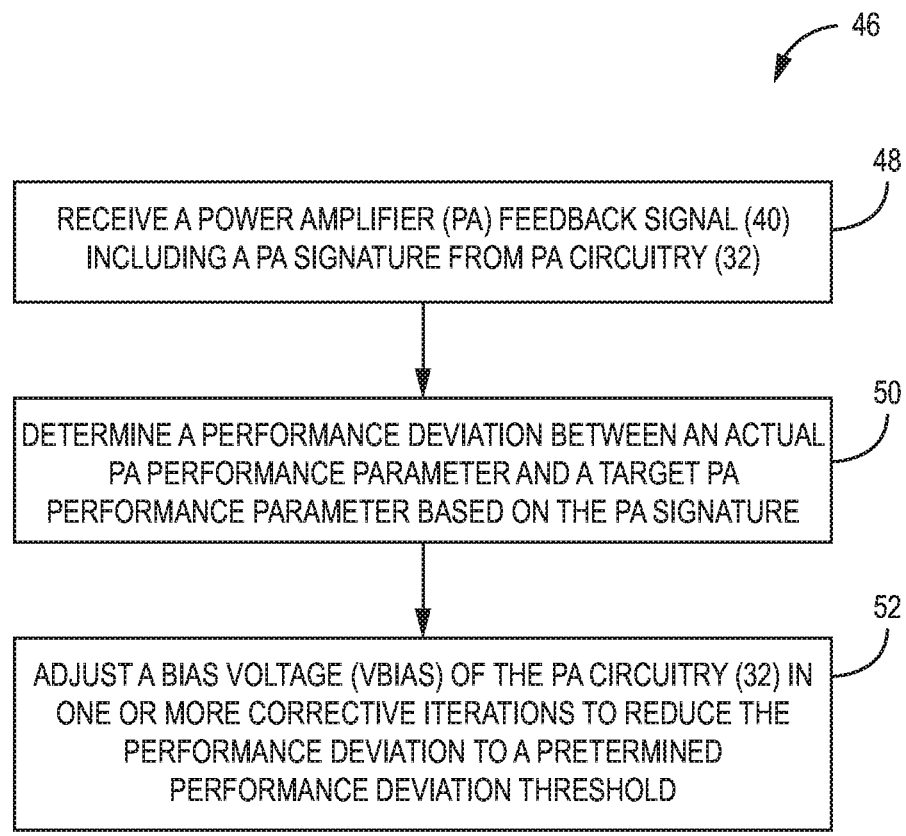
FIG. 3 is a flowchart of an exemplary process that can be used by the RF control circuit of FIG. 2 for optimizing the PA circuitry.

The control circuitry 44 may be able to optimize the PA circuitry 32 based on a process. In this regard, FIG. 3 is flowchart of an exemplary process 46 that can be used by the control circuitry 44 of FIG. 2 for optimizing the PA circuitry 32 in the RF control circuit 30.

According to the process 46, the signal processing circuitry 36 receives the PA feedback signal 40 that includes a PA signature (block 48). The signal processing circuitry 36 is configured to provide the PA signature to the control circuitry 44. The control circuitry 44, in turn, determines the performance deviation between the actual PA performance parameter and the target PA performance parameter based on the PA signature (block 50). The control circuitry 44 may compare the determined performance deviation against the predetermined performance deviation threshold. If the determined performance deviation is greater than the predetermined performance deviation threshold, the control circuitry 44 can adjust the bias voltage $V_{bias}$ in the one or more iterations to reduce the performance deviation to the predetermined performance deviation threshold (block 52). In contrast, if the determined performance deviation is less than or equal to the predetermined performance deviation threshold, the control circuitry 44 can end the process 46.

With reference back to FIG. 2, the RF control circuit 30 may include a bias controller 54. In one example, the bias controller 54 can be an independent controller provided between the control circuitry 44 and the PA circuitry 32. In another example, the bias controller 54 can be integrated with the control circuitry 44. The bias controller 54 is configured to receive a digital voltage control signal 56 from the control circuitry 44. The bias controller 54 may include a voltage digital-to-analog converter (DAC) 58 to convert the digital voltage control signal 56 into an analog voltage control signal 60. The analog voltage control signal 60 may include incremental voltage steps for adjusting the bias voltage $V_{bias}$ in the one or more corrective iterations. Accordingly, the bias controller 54 can provide the analog voltage control signal 60 to the PA circuitry 32 for adjusting the bias voltage $V_{bias}$.

In one non-limiting example, the control circuitry 44 can determine a power gain deviation between an actual power gain and a target power gain of the PA circuitry 32 based on the PA signature. In this regard, the control circuitry 44 can adjust the bias voltage $V_{bias}$ in the one or more corrective iterations to reduce the power gain deviation to a predetermined power gain deviation threshold, which can be predetermined based on a design specification(s) of the RF control circuit 30.

In another non-limiting example, the control circuitry 44 can determine an adjacent channel power ratio (ACPR) deviation between an actual ACPR and a target ACPR of the PA circuitry 32 based on the PA signature. In this regard, the control circuitry 44 can adjust the bias voltage $V_{bias}$ in the one or more corrective iterations to reduce the ACPR deviation to a predetermined ACPR deviation threshold, which can be predetermined based on a design specification(s) of the RF control circuit 30 and/or regulatory requirements in a respective geographical region.

In another non-limiting example, the control circuitry 44 can determine an error vector magnitude (EVM) deviation between an actual EVM and a target EVM of the PA circuitry 32 based on the PA signature. In this regard, the control circuitry 44 can adjust the bias voltage $V_{bias}$ in the one or more corrective iterations to reduce the EVM deviation to a predetermined EVM deviation threshold, which can be predetermined based on a design specification(s) of the RF control circuit 30.

Notably, the control circuitry 44 can be configured to detect and reduce the power gain deviation, the ACPR deviation, and the EVM deviation independently or concurrently. Accordingly, the control circuitry 44 may maintain the target power gain, the target ACPR, and/or the target EVM in the LUT.

The control circuitry 44 may take a single corrective iteration or a number of corrective iterations to reduce the performance deviation to the predetermined performance deviation threshold. In case the control circuitry 44 needs to reduce the performance deviation to the predetermined performance deviation threshold in multiple corrective iterations, the control circuitry 44 may be configured to receive a PA signal update from the signal processing circuitry 36 in each of the multiple corrective iterations. Accordingly, the control circuitry 44 may update the performance deviation based on the PA signature update and adjust the bias voltage $V_{bias}$ in response to the updated performance deviation being greater than the predetermined performance deviation threshold. The control circuitry 44 may stop the multiple corrective iterations in response to determining that the updated performance deviation is less than or equal to the predetermined performance deviation threshold.

FIGS. 4A-4H are graphic diagrams providing exemplary illustrations of the control circuitry 44 configured to eliminate a power gain deviation by adjusting the bias voltage $V_{bias}$ in a number of corrective iterations. In FIG. 4A, no power gain deviation is detected. In FIG. 4B, a bias current drift causes a normalized gain response curve 62 to drift downward from a target normalized gain response curve 64. Accordingly, the control circuitry 44 starts adjusting the bias voltage $V_{bias}$ in multiple corrective iterations. As illustrated in FIGS. 4B-4G, the power gain deviation between the normalized gain response curve 62 and the target normalized gain response curve 64 becomes smaller through a long progression of the multiple corrective iterations, until finally they converge again in FIG. 4H. In this regard, FIGS. 4A-4H prove that the control circuitry 44 can effectively reduce the performance deviation through the one or more corrective iterations.

With reference back to FIG. 2, the signal processing circuitry 36 includes digital baseband processing circuitry 66, crest factor reduction circuitry 68, pre-distorter circuitry 70, and DPD adaption circuitry 72. The digital baseband processing circuitry 66 receives the digital signal 38 and splits the digital signal 38 into a digital in-phase signal 74I and a digital quadrature signal 74Q. The crest factor reduction circuitry 68 receives and provides the digital in-phase signal 74I and the digital quadrature signal 74Q to the pre-distorter circuitry 70. The DPD adaption circuitry 72 receives the PA feedback signal 40, extracts the PA signature from the PA feedback signal 40, and provides the PA signature to the pre-distorter circuitry 70. The pre-distorter circuitry 70 is configured to perform DPD on the digital in-phase signal 74I and the digital quadrature signal 74Q.

The signal processing circuitry 36 includes a pair of signal DACs 76, 78. The signal DAC 76 is configured to convert the digital in-phase signal 74I into an analog in-phase signal 80I. The signal DAC 78 is configured to convert the digital quadrature signal 74Q into an analog quadrature signal 80Q.

The signal processing circuitry 36 includes a pair of phase shifters 82, 84. The phase shifter 82 is configured to phase the analog in-phase signal 80I by 0°. The phase shifter 84 is configured to phase the analog quadrature signal 80Q by 90°. The signal processing circuitry 36 includes a signal combiner 86 configured to combine the analog in-phase signal 80I and the analog quadrature signal 80Q to generate the RF signal 34. The RF signal 34 propagates through a frequency up-converter 88, a transmit filter 90, and an amplifier 92 to reach the PA circuitry 32.

The PA feedback signal 40 propagates through a feedback signal filter 94 and a frequency down-converter 96 to reach a signal splitter 98. The signal splitter 98 splits the PA feedback signal 40 into an analog in-phase feedback signal 100I and an analog quadrature feedback signal 100Q. A pair of feedback phase shifters 102, 104 is configured to phase shift the analog in-phase feedback signal 100I by 0° and the analog quadrature feedback signal 100Q by 90°, respectively. A pair of analog-to-digital converters (ADCs) 106, 108 is configured to convert the analog in-phase feedback signal 100I and the analog quadrature feedback signal 100Q into a digital in-phase feedback signal 110I and a digital quadrature feedback signal 110Q, respectively.

Notably, the RF control circuit 30 as described above can be used to improve linearity of the PA circuitry 32 including not only the Doherty amplifiers, but also the PA circuitry 32 including single-stage or multi-stage amplifiers. The RF control circuit 30 may be provided in base stations, mobile communication devices (e.g., smartphone), radar systems, satellite communication systems, wireless local area networks (WLANs), and so on.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) control circuit comprising:
power amplifier (PA) circuitry configured to amplify an RF signal based on a bias voltage and generate a PA feedback signal comprising a PA signature comprising at least one of a gain characteristic of the PA circuitry and a phase characteristic of the PA circuitry;
signal processing circuitry configured to receive the PA signature and perform digital pre-distortion (DPD) on the RF signal based on the PA signature; and
control circuitry coupled to the PA circuitry and the signal processing circuitry and configured to:
receive the PA signature from the signal processing circuitry;
determine a performance deviation based on the received PA signature, the determined performance deviation comprising at least one of:
an adjacent channel power ratio (ACPR) deviation between an actual ACPR and a target ACPR and a target PA performance parameter; and
an error vector magnitude (EVM) deviation between an actual EVM and a target EVM; and
adjust the bias voltage of the PA circuitry in one or more corrective iterations to reduce at least the EVM deviation to a predetermined performance deviation threshold.

2. The RF control circuit of claim 1 wherein the control circuitry is further configured to adjust the bias voltage to maintain a constant bias current in the PA circuitry.

3. The RF control circuit of claim 1 wherein the control circuitry is further configured to:
determine a power gain deviation between an actual power gain of the PA circuitry and a target power gain of the PA circuitry based on the received PA signature; and
adjust the bias voltage of the PA circuitry in the one or more corrective iterations to reduce the power gain deviation to a predetermined power gain deviation threshold.

4. The RF control circuit of claim 1 wherein the control circuitry is further configured to adjust the bias voltage of the PA circuitry in a plurality of corrective iterations to reduce the performance deviation to the predetermined performance deviation threshold.

5. The RF control circuit of claim 4 wherein in each of the plurality of corrective iterations, the control circuitry is further configured to:
receive a PA signature update;
update the performance deviation based on the PA signature update; and
adjust the bias voltage of the PA circuitry in response to the updated performance deviation being greater than the predetermined performance deviation threshold.

6. The RF control circuit of claim 5 wherein the control circuitry is further configured to terminate the plurality of corrective iterations in response to the updated performance deviation being less than or equal to the predetermined performance deviation threshold.

7. The RF control circuit of claim 1 wherein the signal processing circuitry is further configured to:
receive a digital signal from a digital signal source;
receive the PA feedback signal from the PA circuitry;
perform the DPD on the digital signal based on the PA signature;
convert the digital signal into the RF signal and provide the RF signal to the PA circuitry; and
provide the PA signature to the control circuitry.

8. The RF control circuit of claim 7 wherein the signal processing circuitry comprises:
digital baseband processing circuitry configured to receive the digital signal;

pre-distorter circuitry configured to perform DPD on the digital signal based on the PA signature;

DPD adaption circuitry configured to:
  receive the PA feedback signal comprising the PA signature from the PA circuitry; and
  provide the PA signature to the pre-distorter circuitry and the control circuitry; and at least one signal digital-to-analog converter (DAC) configured to convert the digital signal into the RF signal and provide the RF signal to the PA circuitry.

9. The RF control circuit of claim 7 further comprising a bias controller coupled between the control circuitry and the PA circuitry and configured to:
  receive a digital voltage control signal from the control circuitry;
  convert the digital voltage control signal into an analog voltage control signal; and
  provide the analog voltage control signal to the PA circuitry to adjust the bias voltage.

10. A radio frequency (RF) control circuit comprising:
  power amplifier (PA) circuitry configured to amplify an RF signal based on a bias voltage;
  signal processing circuitry coupled to the PA circuitry and configured to:
    receive a digital signal from a digital signal source;
    receive a PA feedback signal comprising a PA signature comprising at least one of a gain characteristic of the PA circuitry and a phase characteristic of the PA circuitry from the PA circuitry;
    perform digital pre-distortion (DPD) on the digital signal based on the PA signature; and
    convert the digital signal into the RF signal and provide the RF signal to the PA circuitry; and
  control circuitry coupled to the PA circuitry and the signal processing circuitry and configured to:
    receive the PA signature from the signal processing circuitry;
    determine a performance deviation based on the received PA signature, the determined performance deviation comprising at least one of:
      an adjacent channel power ratio (ACPR) deviation between an actual ACPR and a target ACPR; and
      an error vector magnitude (EVM) deviation between an actual EVM and a target EVM; and
    adjust the bias voltage of the PA circuitry in one or more corrective iterations to reduce at least the EVM deviation to a predetermined performance deviation threshold;
  wherein the signal processing circuit is further configured to perform the DPD based on the PA signature independent of the control circuitry.

* * * * *